US012569770B2

(12) United States Patent
Takura et al.

(10) Patent No.: US 12,569,770 B2
(45) Date of Patent: Mar. 10, 2026

(54) INFORMATION PROCESSING APPARATUS AND INFORMATION PROCESSING SYSTEM

(71) Applicant: SONY GROUP CORPORATION, Tokyo (JP)

(72) Inventors: Kento Takura, Tokyo (JP); Tasuku Inui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 632 days.

(21) Appl. No.: 17/906,988

(22) PCT Filed: Mar. 30, 2020

(86) PCT No.: PCT/JP2020/014504

§ 371 (c)(1),
(2) Date: Sep. 22, 2022

(87) PCT Pub. No.: WO2021/199133

PCT Pub. Date: Oct. 7, 2021

(65) Prior Publication Data

US 2023/0122640 A1      Apr. 20, 2023

(51) Int. Cl.
*A63F 13/70* (2014.01)
*H04W 48/18* (2009.01)
(52) U.S. Cl.
CPC ............. *A63F 13/70* (2014.09); *H04W 48/18* (2013.01)
(58) Field of Classification Search
CPC ........ A63F 13/70; A63F 13/77; A63F 13/358; A63F 13/48; H04W 48/18; H04W 24/02; H04L 47/00
See application file for complete search history.

(56) References Cited

U.S. PATENT DOCUMENTS

| | | | | |
|---|---|---|---|---|
| 9,483,258 | B1 * | 11/2016 | Labat ...................... | G06F 9/505 |
| 10,425,830 | B2 * | 9/2019 | Song ................... | H04L 41/5051 |
| 10,779,186 | B2 * | 9/2020 | Dowlatkhah ........... | H04W 8/18 |
| 10,992,396 | B1 * | 4/2021 | Nahata ................ | H04L 41/0896 |
| 11,006,314 | B2 * | 5/2021 | Dowlatkhah ....... | H04L 47/2425 |
| 11,323,954 | B2 * | 5/2022 | Morper ................. | H04W 48/17 |

(Continued)

FOREIGN PATENT DOCUMENTS

| | | | | |
|---|---|---|---|---|
| CN | 108307474 | A | 7/2018 | |
| CN | 110266545 | A * | 9/2019 | ......... H04L 41/0813 |

(Continued)

OTHER PUBLICATIONS

Xia Hongwei, et al., "Research on 5G Network Slicing Technology", Mar. 20, 2020, pp. 59-64, Designing Techniques of Posts and Telecommunications.

(Continued)

*Primary Examiner* — Shean Tokuta
(74) *Attorney, Agent, or Firm* — CHIP LAW GROUP

(57) ABSTRACT

Provided is an information processing apparatus that includes a control section and a communication section. The control section selects a slice according to a genre of a game for which a request for information that is necessary for game play is made by a terminal, and assigns, to the information, an identifier that indicates the slice used to communicate the information. The communication section transmits the information to the terminal through a communication network.

6 Claims, 2 Drawing Sheets

(56) References Cited

U.S. PATENT DOCUMENTS

| | | | | |
|---|---|---|---|---|
| 12,113,670 | B2 * | 10/2024 | Brown | H04L 47/76 |
| 2014/0179426 | A1 * | 6/2014 | Perry | A63F 13/86 463/31 |
| 2017/0070892 | A1 * | 3/2017 | Song | H04L 41/5051 |
| 2017/0208019 | A1 | 7/2017 | Shimojou | |
| 2019/0059074 | A1 * | 2/2019 | Ozturk | H04W 4/70 |
| 2020/0229079 | A1 * | 7/2020 | Lee | H04W 48/02 |
| 2020/0238175 | A1 * | 7/2020 | Smullen | A63F 13/52 |
| 2020/0267592 | A1 * | 8/2020 | Dowlatkhah | H04W 28/0268 |
| 2021/0014737 | A1 * | 1/2021 | Yang | H04W 76/11 |
| 2021/0204207 | A1 * | 7/2021 | Fiorese | H04L 67/146 |
| 2021/0258746 | A1 * | 8/2021 | Humbert | H04W 4/18 |
| 2022/0039002 | A1 * | 2/2022 | Corston-Petrie | H04W 60/04 |
| 2022/0150118 | A1 * | 5/2022 | Brown | H04L 67/131 |
| 2023/0122640 | A1 * | 4/2023 | Takura | H04L 47/00 463/30 |

FOREIGN PATENT DOCUMENTS

| | | | | | |
|---|---|---|---|---|---|
| CN | 115697507 | A | * | 2/2023 | H04W 48/18 |
| EP | 3306987 | A1 | * | 4/2018 | H04W 24/02 |
| JP | 2009-267525 | A | | 11/2009 | |
| JP | 2010-539765 | A | | 12/2010 | |
| JP | WO2018061167 | A1 | * | 7/2019 | H04W 72/542 |
| KR | 20170119296 | A | * | 10/2017 | H04W 16/24 |
| KR | 20200136798 | A | * | 12/2020 | H04L 43/0852 |
| WO | 2016/152587 | A1 | | 9/2016 | |
| WO | WO-2017186092 | A1 | * | 11/2017 | H04W 48/08 |
| WO | WO-2018207674 | A1 | * | 11/2018 | H04W 88/14 |
| WO | WO-2019024604 | A1 | * | 2/2019 | H04L 65/1073 |
| WO | WO-2019051798 | A1 | * | 3/2019 | H04W 28/16 |
| WO | WO-2019064542 | A1 | * | 4/2019 | H04L 43/0876 |
| WO | WO-2019075848 | A1 | * | 4/2019 | H04W 48/18 |
| WO | 2019/167474 | A1 | | 9/2019 | |
| WO | WO-2019182752 | A1 | * | 9/2019 | A63F 13/77 |
| WO | WO-2019238060 | A1 | * | 12/2019 | H04W 48/16 |
| WO | WO-2020091636 | A1 | * | 5/2020 | H04W 72/02 |
| WO | WO-2021199131 | A1 | * | 10/2021 | G06F 3/017 |
| WO | WO-2021199133 | A1 | * | 10/2021 | H04W 48/18 |
| WO | WO-2021199134 | A1 | * | 10/2021 | A63F 13/5252 |
| WO | WO-2022093237 | A1 | * | 5/2022 | H04L 47/821 |
| WO | WO-2022097303 | A1 | * | 5/2022 | G06F 13/00 |

OTHER PUBLICATIONS

International Search Report and Written Opinion of PCT Application No. PCT/JP2020/014504, issued on Jun. 9, 2020, 12 pages of ISRWO.

Kobayashi, et al., "A Study on Resource Allocation to Virtual Networks for Online Games", Institute of Electronics, Information and Communication Engineers (IEICE) Technical Report, ISSN: 0913-5685, vol. 108, No. 31, May 8, 2008, pp. 73-78.

Honma, et al., "How Will Games Change in 5G? New Frontiers in 5G that You should Know by Now", URL: https://www.slideshare.net/5ginnovation/595g-170219938/, Sep. 9, 2019, 89 pages.

Yamamoto, et al., "Latest Trends in Network Slicing Utilization Technology", NHK Science & Technology Research Laboratories, R&D, No. 178, Nov. 2019, pp. 4-11.

Ogura, et al., "A Study on Congestion Avoidance Technology Using Multiple Virtual Networks", Institute of Electronics, Information and Communication Engineers (IEICE) Technical Report, ISSN: 0913-5685, vol. 114, No. 28, May 8, 2014, pp. 51-56.

* cited by examiner

INFORMATION PROCESSING APPARATUS AND INFORMATION PROCESSING SYSTEM

CROSS REFERENCE TO RELATED APPLICATIONS

This application is a U.S. National Phase of International Patent Application No. PCT/JP2020/014504 filed on Mar. 30, 2020. Each of the above-referenced applications is hereby incorporated herein by reference in its entirety.

TECHNICAL FIELD

The present technology relates to an information processing apparatus and an information processing system that are related to slicing.

BACKGROUND ART

In recent years, a game that is played by a mobile apparatus being connected to a network using a mobile communication system has become widespread. For example, Patent Literature 1 discloses a method for updating, using a mobile apparatus, a multiplayer gaming session executed by the mobile apparatus being connected to a communication system.

CITATION LIST

Patent Literature

Patent Literature 1: Japanese Unexamined Patent Application Publication No. 2010-539765

DISCLOSURE OF INVENTION

Technical Problem

However, the connection with a network as disclosed in Patent Literature 1 has been performed using a best-effort communication. The best-effort communication may cause, for example, data loss or data delay depending on a communication condition, and this may result in being unable to play a game smoothly.

In view of the circumstances described above, it is an object of the present technology to provide an information processing apparatus and an information processing system that make it possible to play a game smoothly while using a mobile communication system.

Solution to Problem

In order to achieve the object described above, an information processing apparatus according to an embodiment of the present technology includes a control section and a communication section.

The control section selects a slice according to a genre of a game for which a request for information that is necessary for game play is made by a terminal, and assigns, to the information, an identifier that indicates the slice used to communicate the information.

The communication section transmits the information to the terminal through a communication network.

The control section may select, for each genre of the game, a slice according to an accepted level of latency and a communication capacity necessary for game play.

The control section may further select, for each genre of the game, a slice according to the number of simultaneous connections of the terminals.

The control section may perform the selection of the slice when communication traffic between the communication section and the terminal is greater than or equal to a specified amount.

The control section may perform the selection of a slice when the number of terminals each having a failure in communicating with the communication section is greater than or equal to a specified number.

In order to achieve the object described above, an information processing system according to an embodiment of the present technology includes a terminal and a server apparatus.

The terminal includes a first control section and a first communication section, and the first control section controls the first communication section such that a request for information be made, the information being necessary for game play of a game that is specified by a user.

The server apparatus includes a second control section and a second communication section, the second control section selecting a slice according to a genre of a game for which the request for the information is made by the first terminal, the second control section assigning, to the information, an identifier that indicates the slice used to communicate the information, the second communication section transmitting the information to the first communication section through a communication network.

MODE(S) FOR CARRYING OUT THE INVENTION

[Overall Configuration of Information Processing System]

Figure 1:
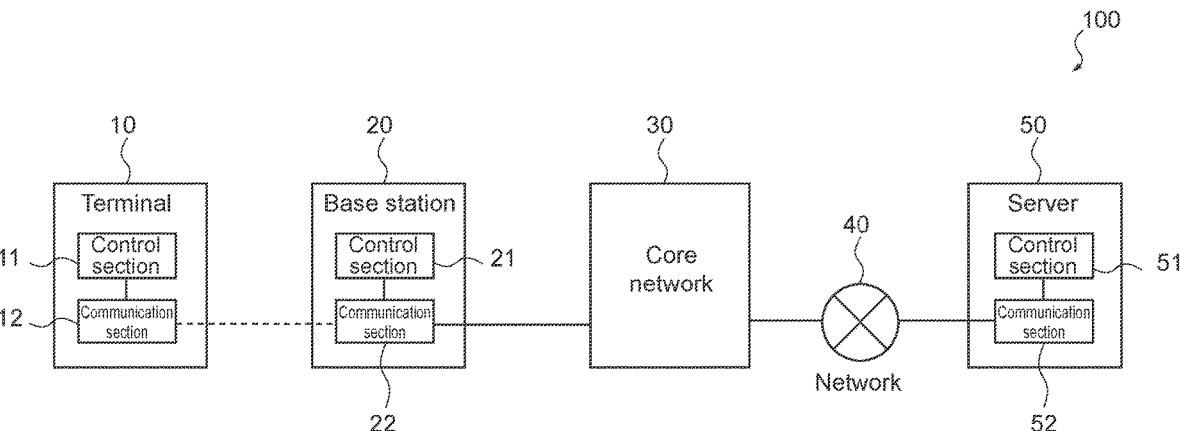
FIG. 1 schematically illustrates an information processing system according to an embodiment of the present technology.

FIG. 1 is a block diagram illustrating an overall configuration of an information processing system 100 according to an embodiment of the present technology. As illustrated in the figure, the information processing system 100 includes a terminal 10, a base station 20, a core network 30, a network 40, and a server apparatus 50.

The terminal 10 is a terminal that can communicate with the base station 20 using the 5th generation mobile communication system (5G), and can be a smartphone. Further, the terminal 10 is not limited to a smartphone, and it is sufficient if the terminal 10 is a 5G-compliant terminal. The terminal 10 includes a control section 11 and a communication section 12, and the communication section 12 communicates with a communication section 22 under the control of the control section 11.

The base station 20 forms a radio access network (RAN), and provides wireless communication services to at least one terminal 10. The base station 20 can wirelessly communicate with the terminal 10 in accordance with a wireless communication scheme based on New Radio (NR), which is a standard that succeeds Long Term Evolution (LTE). The base station 20 includes a control section 21 and the communication section 22, and the communication section 22 communicates with the communication section 12 under the control of the control section 21. Further, the communication section 22 is connected to the network 40 through the core network 30.

The core network 30 is a network that connects an exchanger connected to a control apparatus of the base station 20, and another exchanger, and includes, for example, the Mobility Management Entity (MME), the Serving Gateway (S-GW), and the Packet Data Network Gateway (P-GW).

The network 40 is a computer network that connects a plurality of information processing apparatuses, and is, for example, the Internet. Further, the network 40 may be formed in the core network 30.

The server apparatus 50 is connected to the terminal 10 through the network 40, the core network 30, and the base station 20, and provides services to the terminal 10. The server apparatus 50 includes a control section 51 and a communication section 52, and the communication section 52 communicates with the communication section 22 through the network 40 and the core network 30 under the control of the control section 51.

[Regarding New Radio (NR)]

The NR has two features. A first feature is providing an enhanced massive communication using a frequency band of from 6 GHz up to 100 GHz, and a second feature is efficiently accommodating a plurality of types of communications for various use cases.

Here, examples of the plurality of types of communications include enhanced Mobile Broadband (eMBB), Ultra-Reliable and Low Latency Communications (URLLC), and massive Machine Type Communication (mMTC). Accommodating the plurality of types of communications in a single network using the NR is discussed.

In the case of LTE, the Evolved Packet Core (EPC) is adopted as a communication technology for the core network 30. New Core is discussed as a successor of the EPC. There is a need to efficiently accommodate the plurality of types of communications described above and to keep down CAPEX/OPEX (capital expenditure, operational expenditure) by adopting New Core.

However, it is difficult to provide physically separate networks for the respective types of communications in order to provide the plurality of types of communications, while keeping down CAPEX/OPEX. Thus, operating a plurality of logical networks corresponding to the plurality of types of communications in a physically single network, and flexibly modifying a capacity of the logical network according to a demand for communication traffic for each type of communication, are discussed.

It is conceivable that, for this purpose, each node (that is, communication equipment) of the core network could be implemented as a virtual machine, and an operation of the node depending on a target type of communication could be virtually performed for each logical network. The reason is that, with respect to a function that is implemented using a virtual machine, the number of functions can be increased or reduced according to an increase or a reduction in a demand for communication, and the number of calculator resources assigned for each function can be increased or decreased.

Using a virtual network technology, the function implemented using a virtual machine is connected to another function to create a network. There is a technology called OpenFlow that is an example of such a virtual network technology, in which a rule for each switch is distributed by a central controller, and the switch is operated according to the rule distributed by the controller. OpenFlow enables a flexible network operation by freely switching a switch that connects functions implemented using virtual machines.

A technology that provides logical networks having different properties by combining a virtual machine and a virtual network technology such as OpenFlow, as described above, is called slicing.

[Regarding Slicing]

Figure 2:
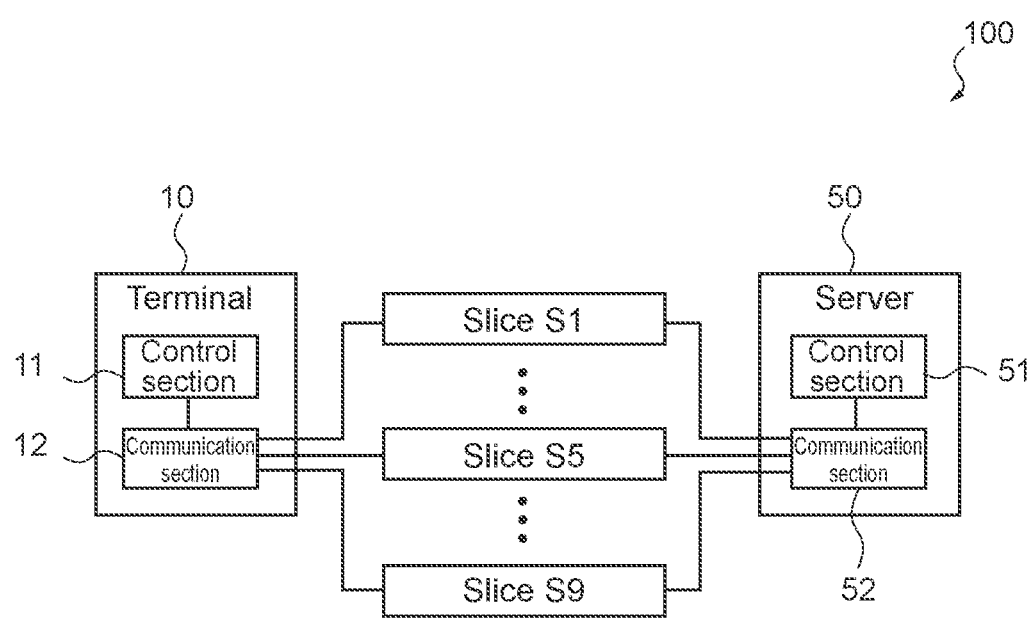
FIG. 2 schematically illustrates a slice formed in the information processing system.

FIG. 2 schematically illustrates slicing in the information processing system 100. As illustrated in the figure, a plurality of slices is formed between the terminal 10 and the server apparatus 50 in a single physical network using slicing. The plurality of slices formed in the information processing system 100 is hereinafter referred to as "slices S1 to S10".

Table 1 is a table in which properties of a slice in the information processing system 100 are given. As given in Table 1, properties with respect to "latency" and properties with respect to "capacity" differ depending on the slice. The "latency" is latency that communication performed between the communication section 12 and the communication section 52 involves, and is caused in two-way communication, that is, communication in a direction from the communication section 12 to the communication section 52 (uplink) and communication in a direction from the communication section 52 to the communication section 12 (downlink). The "capacity" is a communication capacity (a communication rate) when communication is performed between the communication section 12 and the communication section 52, and is a communication capacity when communication is performed in a direction from the communication section 52 to the communication section 12 (downlink).

TABLE 1

| Latency | Capacity | Slice |
|---------|----------|----------|
| High | High | Slice S1 |
| High | Mid | Slice S2 |
| Mid | High | Slice S3 |
| Mid | Mid | Slice S4 |
| High | Low | Slice S5 |
| Low | High | Slice S6 |
| Low | Mid | Slice S7 |
| Mid | Low | Slice S8 |
| Low | Low | Slice S9 |

In Table 1, a latency "High" means low latency, and a latency "Mid" means medium-level latency. A latency "Low" means high latency. Further, a capacity "High" means a high capacity (a high communication rate), and a capacity "Mid" means a medium-level capacity (a medium-level communication rate). A capacity "Low" means a low capacity (a low communication rate).

As given in Table 1, the slice S1 is a slice with low latency and high capacity. The slice S2 is a slice with low latency and medium-level capacity. The slice S3 is a slice with medium-level latency and high capacity. Likewise, with respect to the other slices, properties with respect to latency and properties with respect to capacity differ depending on the slice.

As described above, logically independent networks that can provide communication services different from each other are provided in a single physical network. Slicing makes it possible to flexibly provide logical networks having different uses. Further, slicing makes it possible to flexibly modify a capacity of each slice by increasing or decreasing the number of calculator resources assigned to a virtual machine and by changing switching.

Note that each slice may be formed between the terminal 10 and the server apparatus 50 through a RAN formed by the base station 20, the core network 30, and the network 40. Further, each slice may be formed only in the RAN and the core network 30, or may be formed only in the core network 30. Furthermore, the number of slices is not limited to nine, and may be eight or less, or ten or more.

Further, an identifier called Single-Network Slice Selection Assistance Information (S-NSSAI) is assigned to data communicated between the terminal 10 and the server apparatus 50, and the terminal 10, the RAN, and the core network 30 can determine, using this identifier, which slice is to be used to communicate the data.

[Operation of Information Processing System]

An operation of the information processing system 100 is described. The information processing system 100 makes it possible to provide game streaming services using the terminal 10. The game streaming services make it possible to perform game processing and read software on the side of the server apparatus 50, and to perform an operation using a controller while viewing a play screen of a game in streaming on the side of the terminal 10.

When a user operates the terminal 10 and specifies a game that the user wants to play, the control section 11 controls the communication section 12 such that a request for information (hereinafter referred to as game information) that is necessary for game play of the specified game be made. The information necessary for game play is, for example, a play screen of the game that is generated by the server apparatus 50. The communication section 12 transmits a game information acquiring request to the communication section 52 through the RAN formed by the base station 20, the core network 30, and the network 40.

When the communication section 52 receives the game information acquiring request, the control section 51 selects a slice used to transmit the game information, according to a genre of the game for which the game information acquiring request has been made. Table 2 indicated below is a table in which a genre and a subgenre of a game are given.

| Genre | Examples of subgenre |
| --- | --- |
| Shooting | Bullet curtain shooter, First-person shooter (FPS) |
| Action | Competitive fighting game |
| Adventure | Visual novel |
| Puzzle | Falling-block puzzle |
| Role-playing | Massively multiplayer online role-playing (MMORPG) |
| Simulation | Strategy game, Flight simulator |
| Sports | Soccer game, Table-tennis game |
| Music game | Rhythm game |

Further, Table 3 indicated below is a table in which a subgenre of a game and a slice to be selected are given.

TABLE 3

| Examples of subgenre | Latency | Capacity | Slice |
| --- | --- | --- | --- |
| FPS | High | Mid | Slice S2 |
| Bullet curtain shooter | High | Low | Slice S5 |
| Competitive fighting game | High | Mid | Slice S2 |
| Visual novel | Low | Low | Slice S9 |
| Falling-block puzzle | Mid | Low | Slice S8 |
| MMORPG | High | High | Slice S1 |
| Strategy game | Low | High | Slice S6 |
| Table-tennis game | High | Mid | Slice S2 |
| Rhythm game | High | Low | Slice S5 |

As given in Table 3, in first-person shooters (FPS), lower latency ("High") is better since there is a need to quickly respond to an operation performed by a user, and a medium-level capacity ("Mid") is suitable since there is a need for a high-definition game screen. Thus, a slice suitable for FPS is the slice S2 (refer to Table 1).

On the other hand, in strategy games, latency may be high ("Low") since there is no need to quickly respond to an operation performed by a user, and a high capacity ("High") is suitable since there is a need for a higher-definition game screen. Thus, a slice suitable for strategy games is the slice S6. Furthermore, in visual novels, latency may be high ("Low") since there is no need to quickly respond to an operation performed by a user, and a capacity may be low ("Low"). Thus, a suitable slice is the slice S9.

As described above, an accepted level of latency and a communication capacity necessary for game play differ depending on a genre of game. As given in Table 3, the control section 51 selects, for each genre of game, a slice according to an accepted level of latency and a communication capacity necessary for game play. Further, the control section 51 assigns, to game information, an identifier (such as the S-NSSAI described above) that indicates a slice used for communication, and provides the game information to the communication section 52.

The communication section 52 transmits the game information to the communication section 12 through the network 40, the core network 30, and the RAN formed by the base station 20. In all of or a portion of these communication networks, each piece of information is transmitted using a slice indicated by an identifier. This enables a game to be executed in the terminal 10. Note that mapping of game information to a slice does not necessarily have to be performed by the server apparatus 50, but may be performed by the terminal 10, the base station 20, or the core network 30 using an identifier.

[Effects Provided by Information Processing System]

As described above, in the information processing system 100, a slice necessary to transmit game information is selected by the server apparatus 50 according to a genre of game, and the game information is transmitted to the terminal 10 using the selected slice. This makes it possible to maximally effectively use communication resources.

In particular, when various genres of games are played in a large number of terminals 10, experience in game play can be optimized in each terminal 10 by using a slice according to a genre of game.

Note that the control section 51 may perform the above-described selection of a slice depending on a genre of game at all times, or may select a slice when necessary. Specifically, the control section 51 may select a slice only when communication traffic between the communication section 52 and the terminal 10 or the number of connections of the terminal 10 to the communication section 52 exhibits a value greater than or equal to a specified value. Further, the control section 51 may select a slice only when the number of terminals 10 each having a failure in communicating with the communication section 52 is greater than or equal to a specified number.

[Modifications]

The control section 51 selects, for each genre of game, a slice according to an accepted level of latency and a communication capacity necessary for game play. The control section 51 may further select, for each genre, a slice according to an expected number of simultaneous connections of the terminals 10. Table 4 indicated below is a table in which properties of a slice that include properties with respect to the number of simultaneous connections are given.

TABLE 4

| Latency | Capacity | Number of connections | Slice |
|---------|----------|----------------------|-------|
| Low | Low | High | Slice S10 |

A slice in which latency is high ("Low"), a capacity is low ("Low"), and the number of connections is large ("High") is assumed to be the slice S10, as given in Table 4. The control section 51 can select the slice S10 according to a genre of game. Examples of a genre of game for which the slice S10 is suitable include bingo games and games in which a vote is taken. Further, the control section 51 may assign a slice to each piece of data in a game. For example, in FPS, lower latency ("High") is better but a capacity may be low ("Low") with respect to a motion command and an effect, since there is a need to quickly respond to an operation performed by a user. Further, with respect to, for example, a character image, latency may be high ("Low"), and a medium-level capacity ("Mid") is suitable since there is a need for a high-definition game screen. Thus, it is better if, in FPS, the slice S5 (refer to Table 1) is assigned to a motion command and an effect and the slice S7 (refer to Table 1) is assigned to a character image.

[Hardware Configuration]

Figure 3:
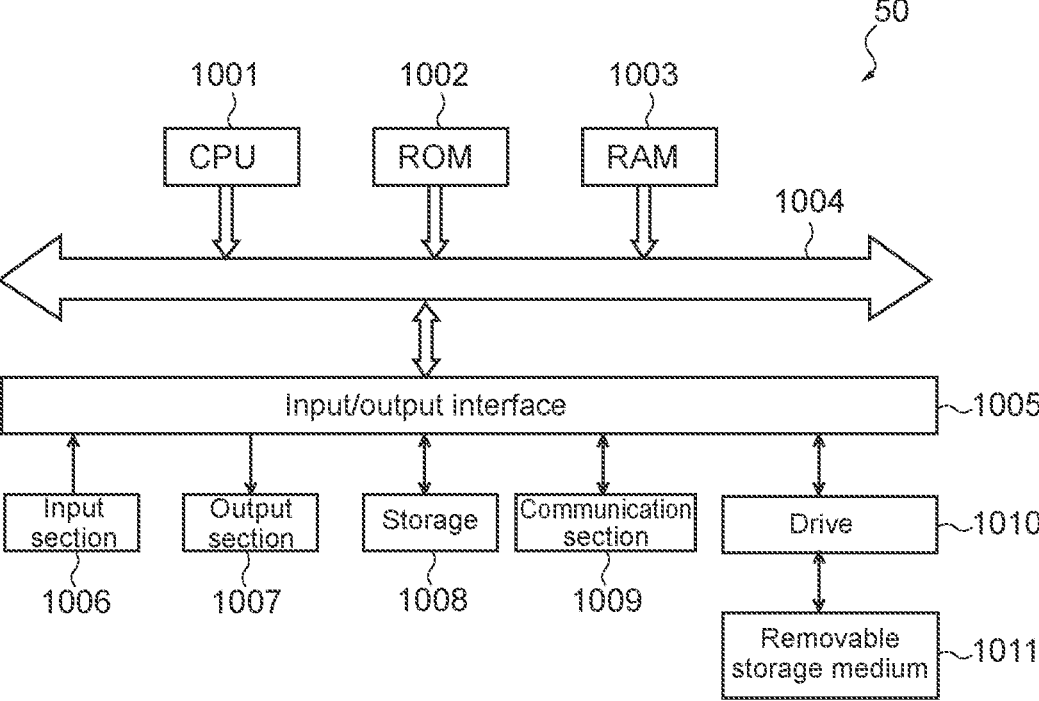
FIG. 3 is a block diagram illustrating a hardware configuration of a server apparatus included in the information processing system.

A hardware configuration of the server apparatus 50 is described. FIG. 3 schematically illustrates a hardware configuration of the server apparatus 50.

As illustrated in the figure, the server apparatus 50 includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input section 1006, an output section 1007, a storage 1008, and a communication section 1009 are connected to the input/output interface 1005. The input section 1006 includes input devices such as a keyboard and a mouse that are used by a user to input an operation command. The output section 1007 outputs a processing operation screen and an image of a processing result to a display device. The storage 1008 includes, for example, a hard disk drive that stores therein a program and various data. The communication section 1009 includes, for example, a local area network (LAN) adapter, and performs communication processing through a network as represented by the Internet. Further, a drive 1010 is connected to the input/output interface 1005. The drive 1010 reads data from and writes data into a removable storage medium 1011 such as a magnetic disk, an optical disk, a magneto-optical disk, or a semiconductor memory.

The CPU 1001 performs various processes in accordance with a program stored in the ROM 1002, or in accordance with a program that is read from the removable storage medium 1011 such as a magnetic disk, an optical disk, a magneto-optical disk, or a semiconductor memory to be installed on the storage 1008, and is loaded into the RAM 1003 from the storage 1008. Data necessary for the CPU 1001 to perform various processes is also stored in the RAM 1003 as necessary.

In the server apparatus 50 having the configuration described above, the series of processes described above is performed by the CPU 1001 loading, for example, a program stored in the storage 1008 into the RAM 1003 and executing the program via the input/output interface 1005 and the bus 1004.

For example, the program executed by the server apparatus 50 can be provided by being recorded in the removable storage medium 1011 serving as, for example, a package medium. Further, the program can be provided via a wired or wireless transmission medium such as a local area network, the Internet, or digital satellite broadcasting.

In the server apparatus 50, the program can be installed on the storage 1008 via the input/output interface 1005 by the removable storage medium 1011 being mounted on the drive 1010. Further, the program can be received by the communication section 1009 via the wired or wireless transmission medium to be installed on the storage 1008. Moreover, the program can be installed in advance on the ROM 1002 or the storage 1008.

Note that the program executed by the server apparatus 50 may be a program in which processes are chronologically performed in the order of the description in the present disclosure, or may be a program in which processes are performed in parallel or a process is performed at a necessary timing such as a timing of calling.

All of the hardware configuration of the server apparatus 50 does not have to be included in a single apparatus, and the server apparatus 50 may include a plurality of apparatuses. Further, a portion of or all of the hardware configuration of the server apparatus 50 may be included in a plurality of apparatuses connected to each other via a network.

Note that the present technology may also take the following configurations.

(1) An information processing apparatus, including:

a control section that selects a slice according to a genre of a game for which a request for information that is necessary for game play is made by a terminal, and assigns, to the information, an identifier that indicates the slice used to communicate the information; and a communication section that transmits the information to the terminal through a communication network.

(2) The information processing apparatus according to (1), in which the control section selects, for each genre of the game, a slice according to an accepted level of latency and a communication capacity necessary for game play.

(3) The information processing apparatus according to (2), in which the control section further selects, for each genre of the game, a slice according to the number of simultaneous connections of the terminals.

(4) The information processing apparatus according to any one of (1) to (3), in which the control section performs the selection of the slice when communication traffic between the communication section and the terminal is greater than or equal to a specified amount.

(5) The information processing apparatus according to any one of (1) to (3), in which the control section performs the selection of a slice when the number of terminals each having a failure in communicating with the communication section is greater than or equal to a specified number.

(6) An information processing system, including:

a terminal that includes a first control section and a first communication section, the first control section controlling the first communication section such that a request for information be made, the information being necessary for game play of a game that is specified by a user; and a server apparatus that includes a second control section and a second communication section, the second control section selecting a slice according to a genre of a game for which the request for the information is made by the first terminal, the second control section assigning, to the information, an identifier that indicates the slice used to communicate the information, the second communication section transmitting the information to the first communication section through a communication network.

REFERENCE SIGNS LIST

10 terminal
11 control section
12 communication section
20 base station
21 control section
22 communication section
30 core network
40 network
50 server apparatus
51 control section
52 communication section
100 information processing system

The invention claimed is:

1. An information processing apparatus, comprising:
circuitry configured to:
    receive, from a terminal, a request for information that is necessary for game play of a game;
    select, for a genre of the game for which the request for the information that is necessary for the game play is received, a slice based on a number of simultaneous connections of a plurality of terminals that includes the terminal;
    assign, to the information, an identifier that indicates the slice to communicate the information from the information processing apparatus to the terminal; and
    transmit, based on the assignment of the identifier that indicates the slice, the information to the terminal via a communication network.

2. The information processing apparatus according to claim 1, wherein
    the circuitry is further configured to select, for each genre of a plurality of genres corresponding to a plurality of games, the slice from a plurality of slices based on an accepted level of latency and a communication capacity necessary for game play associated with the each genre, and
    the plurality of games includes the game.

3. The information processing apparatus according to claim 1, wherein
    the circuitry is further configured to execute the selection of the slice based on a communication traffic between the information processing apparatus and the terminal that is greater than or equal to a specified amount.

4. The information processing apparatus according to claim 1, wherein
    the circuitry is further configured to execute the selection of the slice in a case where a number of terminals from the plurality of terminals that each fail to communicate with the information processing apparatus is greater than or equal to a specific number.

5. An information processing system, comprising:
a terminal that includes first circuitry configured to:
    control transmission of a request for information, wherein the information is necessary for game play of a game; and
a server apparatus that includes second circuitry configured to:
    receive, from the terminal, the request for the information that is necessary for the game play of the game;
    select, for a genre of the game for which the request for the information is received, a slice based on a number of simultaneous connections of a plurality of terminals that includes the terminal;
    assign, to the information, an identifier that indicates the slice to communicate the information from the server apparatus to the terminal; and
    transmit, based on the assignment of the identifier that indicates the slice, the information to the terminal via a communication network.

6. An information processing apparatus, comprising:
circuitry configured to:
    receive, from a terminal, a request for information that is necessary for game play of a game;
    select, for a genre of the game for which the request for the information that is necessary for the game play is received, a slice in a case where a number of terminals, from a plurality of terminals, that each fail to communicate with the information processing apparatus is greater than or equal to a specific number, wherein the plurality of terminals includes the terminal;
    assign, to the information, an identifier that indicates the slice to communicate the information from the information processing apparatus to the terminal; and
    transmit, based on the assignment of the identifier that indicates the slice, the information to the terminal via a communication network.

* * * * *